(12) United States Patent
Kellerer et al.

(10) Patent No.: US 9,607,790 B2
(45) Date of Patent: Mar. 28, 2017

(54) OPERATING DEVICE WITH A PLURALITY OF ACTUATING ELEMENTS ARRANGED NEXT TO AND/OR BELOW ONE ANOTHER

(75) Inventors: Johannes Kellerer, Mainburg (DE); Josef Ritzer, Perlesreut (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 150 days.

(21) Appl. No.: 13/704,874

(22) PCT Filed: Jun. 16, 2011

(86) PCT No.: PCT/DE2011/001344
§ 371 (c)(1),
(2), (4) Date: Dec. 17, 2012

(87) PCT Pub. No.: WO2012/022281
PCT Pub. Date: Feb. 23, 2012

(65) Prior Publication Data
US 2013/0087442 A1    Apr. 11, 2013

(30) Foreign Application Priority Data
Jun. 18, 2010  (DE) .......... 10 2010 024 345

(51) Int. Cl.
*H01H 13/85*  (2006.01)
*B60K 37/06*  (2006.01)
(Continued)

(52) U.S. Cl.
CPC ............ *H01H 13/85* (2013.01); *B60K 37/06* (2013.01); *G09B 21/003* (2013.01);
(Continued)

(58) Field of Classification Search
CPC ...... B60K 37/06; G09B 21/003; H01H 13/84; H01H 13/85; H01H 2217/018; H01H 2217/024; H01H 2217/034; H01H 2217/006
(Continued)

(56) References Cited

U.S. PATENT DOCUMENTS 6,005,496 A * 12/1999 Hargreaves et al. .......... 341/22
6,061,666 A *  5/2000 Do et al. ........................ 705/43
(Continued)

FOREIGN PATENT DOCUMENTS

FR    2 904 442 A1    2/2008
JP    11-95654 A      4/1999

OTHER PUBLICATIONS

Corresponding International Search Report with English Translation dated Feb. 14, 2012 (four (4) pages).
German-language Written Opinion dated Feb. 14, 2012 (PCT/ISA/237) (five (5) pages).

*Primary Examiner* — Joseph Feild
*Assistant Examiner* — Omar Casillashernandez
(74) *Attorney, Agent, or Firm* — Crowell & Moring LLP

(57) ABSTRACT

An operating device with a number of actuating elements, such as switches and/or pushbuttons, arranged next to one another and/or one below the other is provided. The actuating elements are delimited, at least in part, by at least one frame element. The frame element is provided, at least in some regions, with surface sections that are shaped such that they can be detected haptically. One actuating element is respectively assigned to at least a part of the haptically detectable surface sections.

12 Claims, 1 Drawing Sheet

(51) Int. Cl.
  *G09B 21/00* (2006.01)
  *H01H 13/84* (2006.01)
(52) U.S. Cl.
  CPC ....... *H01H 13/84* (2013.01); *H01H 2217/006* (2013.01); *H01H 2217/018* (2013.01); *H01H 2217/024* (2013.01); *H01H 2217/034* (2013.01)
(58) Field of Classification Search
  USPC ............... 341/27; 200/5 A; 340/407.1, 407.2
  See application file for complete search history.

(56) References Cited

U.S. PATENT DOCUMENTS

| | | | |
|---|---|---|---|
| 6,480,372 B1* | 11/2002 | Vong et al. | 361/679.09 |
| 6,501,394 B1 | 12/2002 | Hamilton et al. | |
| 6,655,581 B1* | 12/2003 | Takishima et al. | 235/379 |
| 7,187,394 B2* | 3/2007 | Chandane | 715/865 |
| 7,322,712 B2* | 1/2008 | Lai | G02F 1/133604 |
| | | | 362/225 |
| 8,072,423 B2* | 12/2011 | Rolus Borgward | 345/157 |
| 2002/0171627 A1* | 11/2002 | Noguchi et al. | 345/156 |
| 2006/0071908 A1* | 4/2006 | Rehbock | 345/168 |
| 2008/0047814 A1 | 2/2008 | Crohas et al. | |
| 2009/0046066 A1 | 2/2009 | Friedrich et al. | |
| 2010/0188349 A1* | 7/2010 | Molard | B60K 35/00 |
| | | | 345/173 |

\* cited by examiner

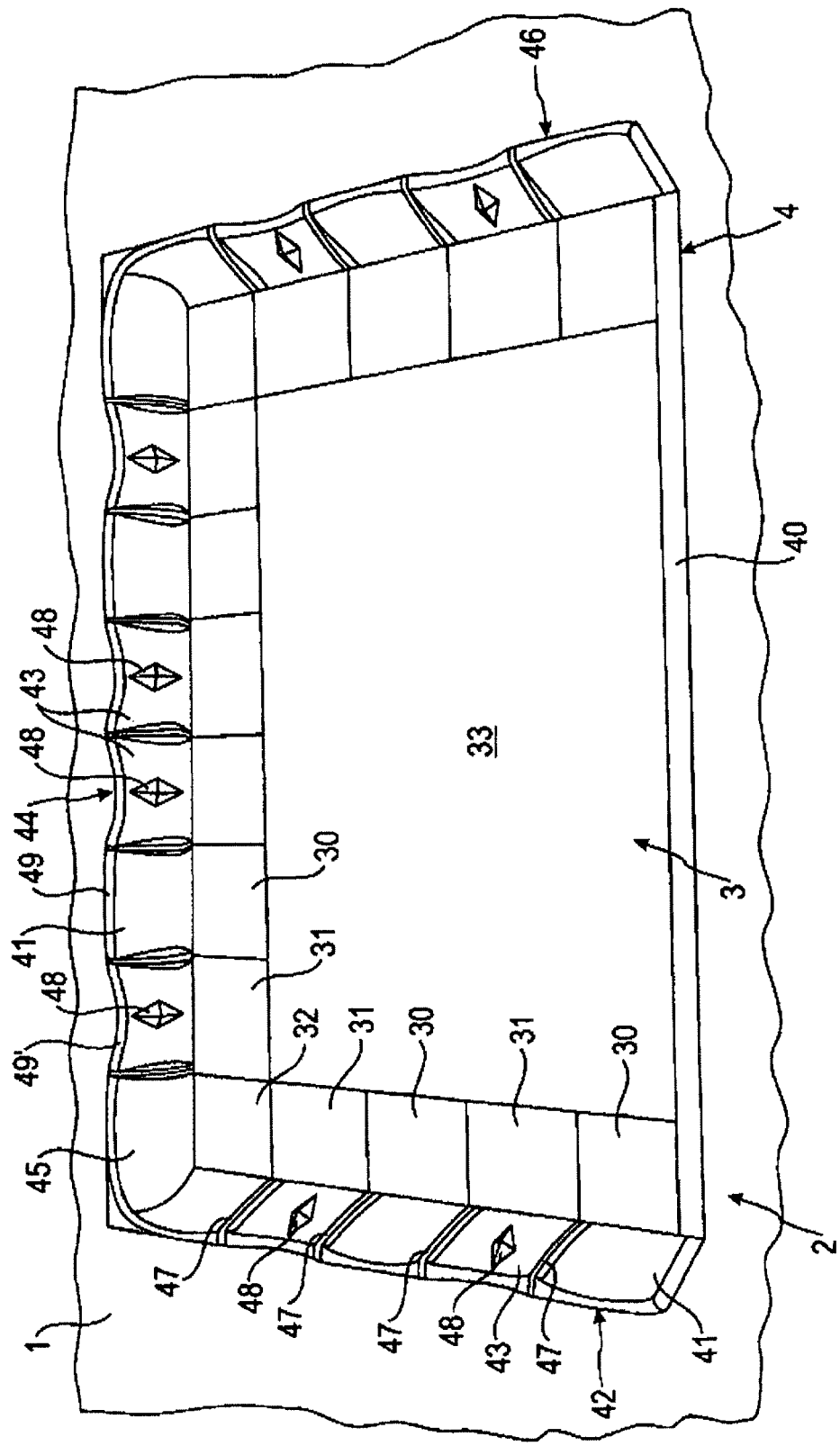

OPERATING DEVICE WITH A PLURALITY OF ACTUATING ELEMENTS ARRANGED NEXT TO AND/OR BELOW ONE ANOTHER

BACKGROUND AND SUMMARY OF THE INVENTION

Exemplary embodiments of the present invention relate to an operating device with a plurality of actuating elements arranged next to one another and/or one below the other, in particular switches and/or pushbuttons. It further relates to an operating device of this type with a touch-sensitive screen.

If operating elements of this type are arranged on an operating device that is subjected to strong vibrations or other relative motions in relation to the operator, it is difficult for the operator to identify and accurately actuate the corresponding actuating element. The identification by the operator is particularly difficult when the operator is visually concentrated elsewhere at the same time and can look at the operating device only briefly or only out of the corner of his/her eye or not at all during the operation. In particular, this actuation is difficult when the actuating elements are arranged in panels or rows of keys, for example, as a membrane key or other keys or switches, which cannot be distinguished from one another haptically. Touch-sensitive screens, which are becoming increasingly widespread, are another example of actuating elements of this type.

Touch-sensitive screens are being used increasingly in vehicles, in particular in ground vehicles and also in aircraft. They thereby take over functions that previously had been provided by switches and pushbuttons. In the place of a physical pushbutton or switch on the touch-sensitive screen a limited area is defined and shown to the user as a button. When the user touches this button, the touch-sensitive screen registers this touch at this location on the screen and thereby triggers a corresponding switch function or key function, which conventionally was triggered via the switch or pushbutton.

In particular for the "blind" operation of a conventional switch or pushbutton, that is, an operation in which the user feels the switch or pushbutton and thereby recognizes it without having to look at it, hitherto discrete switches and pushbuttons were provided with an individualized surface or contour that made it possible to feel and identify the switch or pushbutton. Designs of this type are referred to as haptic codes. Haptic codes of this type were frequently used in aircraft construction, in particular in aircraft flying very fast in order to make it possible for the pilot to operate certain instruments without having to look at the associated operating panel.

However, the user does not receive this type of haptic feedback when he/she has to carry out corresponding switch or pushbutton actuations on a flat touch-sensitive screen. The flat surface of the touch-sensitive screen does not make it possible to provide haptic codes thereon, since the property of the surface for the flexible reproduction of different actuating scenarios would be considerably restricted by such measures for changing the surface.

These problems are not limited to aircraft, but can occur in any other vehicle (land vehicle, watercraft, spacecraft) or also with stationary machines that are exposed to strong oscillations or vibrations.

U.S. Pat. No. 6,501,394 B1 discloses an operating interface for the visually impaired in which at the edge of a screen, which can be embodied as a touch-sensitive screen, a roller bar is provided, which has a plurality of disks rotatable about a common axis, each of which has a polygonal cross-sectional shape. These roller bars are therefore provided on their respective circumference with a plurality of faces, on which respectively information fields in Braille are provided. In this manner by rotating individual disks, which are respectively assigned to one switch panel on the screen or next to the screen, a user can be provided with corresponding information in Braille.

U.S. Patent Publication No. 2009/0046066 A1 discloses an actuating device for machine control with a screen on which two display windows are provided. A plurality of control buttons are assigned to of each of the display windows, which control buttons are arranged around the screen. These control buttons can also be arranged as touch-sensitive actuating fields on the screen, when it is embodied as a touch-sensitive screen. There is no ability to distinguish the control buttons or the operating panels haptically.

French Patent Document FR 2 904 442 A1 discloses a keypad that is arranged next to a screen at one side of the screen. Cursor movements and selection commands can be given to the screen by means of the keys. The individual keys of the keypad are provided with symbols that can be detected haptically.

Exemplary embodiments of the present invention are directed to an operating device with a plurality of actuating elements arranged next to one another or one below the other, in particular switches and/or pushbuttons, which, without restricting the flexibility of an operating device of this type, provide a haptically oriented actuation of the actuating elements or other control elements provided on the operating device.

An operating device of this type according to the invention with a plurality of actuating elements arranged next to one another and/or one below the other, in particular switches and/or pushbuttons, wherein the actuating elements are buttons and/or touch surfaces that do not differ haptically from one another, is characterized in that the majority of the actuating elements is delimited at least in part by at least one frame element and wherein the frame element is provided at least in some regions with surface sections that have a structure that can be detected haptically and which are assigned to respectively one actuating element, such that the structure that can be detected haptically gives a haptic orientation for actuating the buttons and/or touch fields that form the actuating elements and that cannot be distinguished from one another haptically.

The frame element is thus provided, at least in some regions, with surface sections that are shaped such that they can be detected in a haptically distinguishable manner, and respectively one actuating element is assigned to at least a part of the surface sections that can be detected in a haptically distinguishable manner.

The provision of the frame element embodied at least in some regions with surface sections that can be detected haptically at the edge, for example, of a row of actuating elements makes it possible in a simple manner to give a haptic orientation to a hand searching for the actuating elements, for example the touch surfaces and/or buttons. If the actuating elements are then arranged such that respectively one actuating element (touch surface and/or button or another control element) is assigned to one of the surface sections that can be detected haptically on the frame element, the user needs only to detect the actuating element next to the surface section he/she has haptically detected, for example, to press the touch surface or button, in order to actuate the corresponding touch surface or button. For this purpose respectively one actuating element is assigned to at least a part of the haptically detectable surface sections.

The present invention is also advantageous because in many cases no additional component is necessary, since a plurality of actuating elements installed in a front plate of an operating device is often surrounded by a frame, so that it is necessary merely to embody this frame, which is already present, according to the invention.

Preferably, at least one of the haptically detectable surface sections is provided with an individual surface structure that makes the haptically detectable surface section identifiable. It is thereby possible for the user to make a distinction between several haptically detectable surface sections lying next to one another. The individual surface structure can be formed, for example, by a tip or elevation projecting from the surface of the surface section or, for example, by one or more ribs running parallel to one another.

The surface structure can be repeated along the edge of the plurality of actuating elements such that, for example, every third or every fifth surface section has the same surface structure; in other words: further surface sections having a different surface structure are provided between the surface sections provided with the same surface structure.

It is also advantageous if at least one of the haptically detectable surface sections is embodied with an individually embodied edge contour, which makes the haptically detectable surface section identifiable. This identification feature is thus not provided on the surface itself but at the edge of the surface and can be provided either independently of the identification feature of the individual surface structure or in addition thereto. Due to possibility of combination with different individual surface structures and different individually detectable edge contours, a plurality of unique haptic codes of the respective surface sections can be formed.

If the frame element is preferably embodied as a retaining strip, on which an operator can support his/her operating hand, a secure and reliable operation is possible even with high accelerations and vibrations acting on the operator, since the operating hand can be mechanically supported on the retaining strip formed by the frame element, whereby the risk of accidentally touching the actuating element is considerably reduced.

This additional stabilization by the frame element is particularly advantageous when the retaining strip is embodied such that the operator can also hold onto it by his/her operating hand. It is thereby possible to actively fix the operating hand with the fingers and also during the operation to release only that finger that is necessary for touching the actuating element.

In a particularly preferred embodiment of the invention the actuating elements are formed by touch surfaces and/or buttons that are shown functionally on a touch-sensitive screen. An operating device of this type with a touch-sensitive screen as well as an associated control device for the touch-sensitive screen, by means of which touch surfaces and/or buttons can be shown functionally on the touch-sensitive screen, is preferably embodied such that the touch-sensitive screen is delimited at least in part by at least one frame element, wherein the frame element is provided at least in some regions with surface sections that are shaped such that they can be detected haptically. Respectively one touch surface and/or button on the touch-sensitive screen is thereby assigned to at least a part of the haptically detectable surface sections.

BRIEF DESCRIPTION OF THE DRAWING FIGURE

Preferred exemplary embodiments of the invention with additional design details and further advantages are described and explained in more detail below with reference to the attached drawing.

FIG. 1 is a perspective view of an exemplary embodiment of an operating device according to the invention with a touch-sensitive screen that is surrounded on three sides by a frame element embodied according to the invention.

DETAILED DESCRIPTION

FIG. 1 shows a section from an instrument panel 1, for example, of an aircraft. An operating device 2 with a touch-sensitive screen 3 is provided in the instrument panel 1. The touch-sensitive screen 3 is surrounded by a frame 4, which is connected to the instrument panel 1. In the example shown, the frame 4 has a first frame element 40, which projects slightly in a bead-like manner from the surface of the instrument panel 1 and runs on a side edge of the touch-sensitive screen 3. The other three side edges of the touch-sensitive screen 3 are delimited by frame elements 42, 44, 46 of the frame 4, which project further from the instrument panel 1 than the first frame element 40. Due to their greater height these three frame elements 42, 44, 46 form retaining strips on which an operator can support his/her hand.

The touch-sensitive screen 3 is acted on in a generally known manner by a control device—not shown—such that among other things touch surfaces and/or buttons 30, 31, 32 as actuating elements along the edge of the touch-sensitive screen 3 are displayed and functionally shown thereon. The central region 33 of the touch-sensitive screen 3 is thereby available for other display purposes.

As can be seen in FIG. 1, the three frame elements 42, 44, 46 of the frame 4 embodied as retaining strips are provided on their surface side pointing towards the touch-sensitive screen 3 with differently embossed surface sections 41, 43, 45. These surface sections 41, 43, 45 are respectively embodied in a concave manner as a trough-like recess and in this manner respectively form a haptically detectable surface section. Between these haptically detectable surface sections 41, 43, 45 respectively a web 47 projecting from the surface in a rib-like manner is provided which clearly perceptibly separates the haptically detectable surface sections from one another.

The haptically detectable surface sections 41, 43, 45 are embodied differently. While the first group of haptically detectable surface sections 41 has only one trough-like concave recess, a second group of haptically detectable surface sections 43 is provided with a rhombus-like lug 48 projecting out of the trough-like recess, which renders possible a clearly palpable haptic distinction of the surface sections 43 from the surface sections 41. A further group of the haptically detectable surface sections is formed by the corner sections 45, which are merely recessed in a trough-like manner, but due to their corner structure are likewise clearly haptically detectable.

As can be seen in FIG. 1, the haptically detectable surface sections 41 that are only embodied in a trough-like manner are alternated with the haptically detectable surface section 43, which are provided with the rhombus-like lug 48. Only on the long side of the touch-sensitive screen 3 do two surface sections 43 provided with a rhombus-like lug 48 meet in the center and there lie directly next to one another, which makes an additional haptic orientation possible for the operator.

The upper edge of the frame elements 42, 44, 46 embodied as a retaining element with haptically detectable surface sections is provided with a wave-like shaping, wherein respectively one wave peak 49 is assigned to a surface section 41 provided only with the trough-like recess, and wherein respectively a wave trough 49' is assigned to a surface section 43 provided with the rhombus-like lug 48. In this manner it is also possible for an operator to gain a haptic orientation by moving his fingers along the edge of the frame 4.

The control device for the touch-sensitive screen 3 causes the touch surfaces and/or buttons 30, 31, 32 functionally shown at the edge of the touch-sensitive screen 3 to be placed such at the edge of the screen 3 that respectively one of the buttons 30, 31, 32 is assigned to one of the haptically detectable surface sections 41, 43, 45.

In this manner it is possible for the user to orient himself/herself haptically by the frame element 42, 44, 46 in order then directly next to the haptically identified surface section 41, 43, 45 to actuate the assigned touch surface and/or button 30, 31, 32.

The description of the invention based on touch surfaces and/or buttons embodied on a touch-sensitive screen represents merely one exemplary embodiment. In principle, the actuating elements can be arranged next to one another or one below the other, for example, in a row or along a bent curve. The decisive factor is that the frame with the haptically coded frame elements extends along this plurality of actuating elements and follows their geometric arrangement so that an actuating element is located immediately next to each haptically coded surface section of the frame.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Instrument panel
2 Operating device
3 Touch-sensitive screen
4 Frame
30 Actuating element (touch surface and/or button)
31 Actuating element (touch surface and/or button)
32 Actuating element (touch surface and/or button)
33 Center region of the touch-sensitive screen
40 First frame element
41 Surface section
42 Frame element
43 Surface section
44 Frame element
45 Surface section
46 Frame element
47 Web projecting in a rib-like manner
48 Rhombus-like lug
49 Wave peak
49' Wave trough

The invention claimed is:

1. An operating device for an instrument panel of a vehicle, the device comprising:
   a touch-screen display including a plurality of haptically indistinguishable interactive surface areas, each interactive surface area operable as a touch-implemented actuator for operating an aspect of the vehicle;
   at least one frame element including a frame surface having a plurality of consecutive sections, each section corresponding to no more than one interactive surface area, and each interactive surface area corresponding to exactly one section,
   wherein at least one section includes a haptically detectable structure, and is adjacent at least one other section not including the haptically detectable structure, such that the haptically detectable structure provides a haptic orientation for haptically identifying the interactive surface area,
   wherein the frame element includes at least one wall projecting from the instrument panel, wherein the at least one wall is arranged in a plane that is inclined relative to the instrument panel, and
   wherein the haptically detectable structure is disposed on and extends normal to the plane of the at least one wall such that it is disposed above one interactive surface area.

2. The operating device according to claim 1, wherein at least one of the surface areas includes an individual surface structure that makes the haptically detectable surface section identifiable.

3. The operating device according to claim 1, wherein at least one of the surface areas has an individually embodied edge contour, which makes the haptically detectable surface section identifiable.

4. The operating device according to claim 1, wherein the frame element is a retaining strip configured to support an operator's operating hand.

5. The operating device according to claim 4, wherein the retaining strip is configured so that it can be held onto by an operator's operating hand.

6. The operating device according to claim 1, wherein the interactive surface area are functionally displayed on the touch-screen display.

7. The operating device according to claim 1, wherein the frame element includes at least three sides that project from the instrument panel.

8. The operating device according to claim 7, wherein the frame element includes a fourth side that projects to a smaller distance from the instrument panel than the at least three sides.

9. The operating device according to claim 7, wherein the at least three sides each include the at least wall projecting from the instrument panel.

10. The operating device according to claim 9, wherein the haptically detectable structure includes the walls and a top portion of the inclined walls.

11. The operating device according to claim 1, wherein the plurality of frame sections includes three consecutive sections with the haptically detectable structure.

12. The operating device according to claim 3, wherein the individually embodied edge contour has a wave-like shaping forming a surface that can be held onto by an operator's hand.

* * * * *